Aug. 5, 1969  U. D. POLLY  3,459,614
METHOD FOR MAKING PLASTIC ARTICLES
Filed March 15, 1965  2 Sheets-Sheet 1

INVENTOR.
UHEL D. POLLY
BY Earnest Carl Edge

Aug. 5, 1969  U. D. POLLY  3,459,614
METHOD FOR MAKING PLASTIC ARTICLES
Filed March 15, 1965  2 Sheets-Sheet 2

INVENTOR.
UHEL D. POLLY
BY Ernest Carl Edge

United States Patent Office 3,459,614
Patented Aug. 5, 1969

3,459,614
METHOD FOR MAKING PLASTIC ARTICLES
Uhel D. Polly, Margate, Fla., assignor to Consolidated Productions, Inc., a corporation of Florida
Filed Mar. 15, 1965, Ser. No. 439,733
Int. Cl. B65h 81/00; B31c 13/00; B29b 3/00
U.S. Cl. 156—174
6 Claims

ABSTRACT OF THE DISCLOSURE

A method for manufacturing plastic articles which consists of twisting a relatively flat strip of plastic so that it is helical in shape, winding the plastic in layers on a holder, sealing the layers together in a narrow longitudinal area while the twisted plastic remains on the holder, adding stiffening means to the plastic while it remains on the holder and passing a cutting element through the plastic in a direction longitudinally along the holder thereby permitting the cut unsealed layers of plastic to flare outwardly so that the stiffening element and heat sealed longitudinal portion constitutes an axis.

---

This invention relates in general to the producing of plastic articles and in more particularity to a method therefor.

It is a primary object of this invention to provide a method by which plastic articles such as Christmas wreaths, decorative streamers, etc., may be made with a minimum of time and effort expended and whereby such articles may be mass produced economically.

Throughout this specification I will be referring to plastic articles but it is to be understood that my process and apparatus may be used with any type of material which adapts itself to such use and still fall within the scope of my invention. For example, certain types of cloth or paper could be used instead of the plastic referred to. The word plastic in this specification is being used in its broadest interpretation.

Another object of the invention is to provide a process and apparatus for manufacturing plastic articles whereby heat is used to seal the component parts together thereby eliminating any need for stitching or stapling of the material.

A further object of the invention is to provide a process and apparatus whereby the stiffening members may be incorporated in the finished article at the time of manufacture thus providing a simple three-step method of producing finished articles.

A still further object of the invention is to provide a method and apparatus for making plastic articles which is economical to build, easy to operate, and relatively simple to understand.

Further objects, advantages, uses, and adaptations of the invention will be apparent from the following description taken in conjunction with the accompanying drawing wherein.

Figure 1:
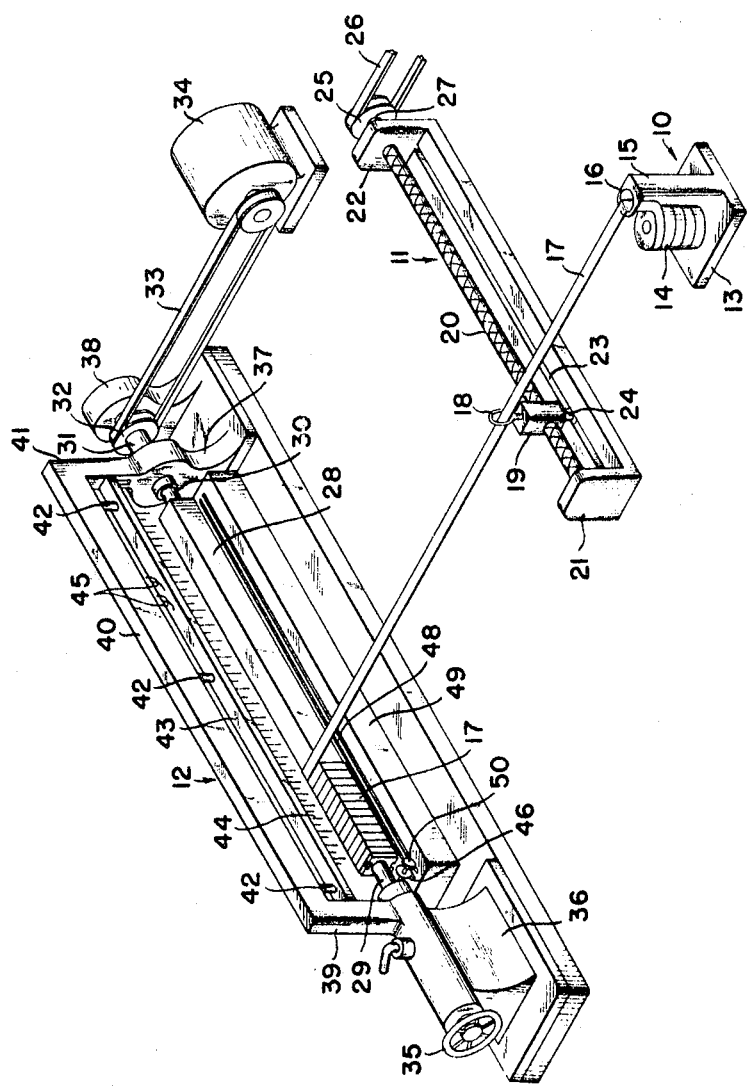
FIGURE 1 is a perspective view of the entire apparatus in operation.

Referring now to FIGURE 1 of the drawing, 10 is the holder for supporting the plastic supply 14, here shown as a roll. Roll 14 is supported on base 13. Arm 15 extends from base 13 vertically a distance farther than the top of spool 14 and is provided at its top with horizontal guide member 16 which extends out over roll 14.

Plastic strip 17 is shown as extending through guide member 16 and also through ring 18 of guide means 11. Guide means 11 is used to guide the material as it is wound onto the winding means 12 after it comes from supply 14 on holder 10.

Guide means 11 is shown as comprised of two end pieces 21 and 22 between which screw 20 extends. Screw 20 is threaded in two directions so that traveller 19 may travel in either direction. Ring 18, through which strip 17 extends, is located on top of traveller 19 and moves therewith. Traveller 19 is also provided with a stem 24 on the bottom thereof which rides in groove 23 in the bottom of guide means 11 so as to keep traveller 19 in an upright position at all times.

Screw 20 extends through end 22 and is connected to an axle 27 carrying pulley 25. Belt 26 travels over pulley 25 and is connected to a suitable driving means (not shown).

The winding portion of the apparatus is shown collectively as 12. It consists of end members 36 and 37 with a longitudinal top member 40 extending between the tops of members 36 and 37 and supported by ends 39 and 41.

End member 36 has an adjusting wheel 35 for extending or retracting spool support 29 to and away from spool 28. End member 37 has spool support 30 extending therefrom in the same horizontal and vertical planes as support 29.

Extending downwardly from top member 40 is heating and sealing element 43 supported by members 42. Said supports 42 may be in the form of springs or rods or whatever form is desired. When heating element 43 is to be moved by hand, as illustrated in these drawings, then members 42 may take the form of springs. However, if air jacks were to be used for moving heating element 43 up and down then a different connection to top member 40 would be used.

Heating element 43 has a plurality of teeth 44 extending downwardly and an electrical connection 45 for connection to a source of electrical power.

Spool 28 is shown as held at each end by spool supports 29 and 30 with plastic strip 17 being wound thereon.

Below spool 28 is cutting support 49 extending between support members 36 and 37. In said cutting support 49 is a longitudinal groove 48 (FIGURE 3) with an auxiliary groove on each side thereof. Cutting member 46 is shown as a knife-edged wheel which rides on guides 50 and is driven by any suitable power means such as a motor connected to pulley 47.

As explained more fully later, as member 46 is moved along support 49 in groove 48 the blade will cut the plastic material wound on spool 28.

Attention is called to the fact that in FIGURE 1 the groove 48 extends outwardly toward member 36 a distance far enough to permit cutting wheel 46 to move beyond the end of spool 28 when the cutter is not in use.

At the opposite end of the winder, axle 31 is rotatably connected to mount 30 and is supported on its outer end by support 38. Pulley 32 is fastened to axle 31, belt 33 extends over pulley 32 and is connected to power means 34. As can be seen in this FIGURE 1, when power means 34 is turned on, belt 33 turns pulley 32 which turns axle 31 and spool support 30, thus spool 28 is given a revolving motion to wind the plastic strip 17 thereon.

Figure 2:
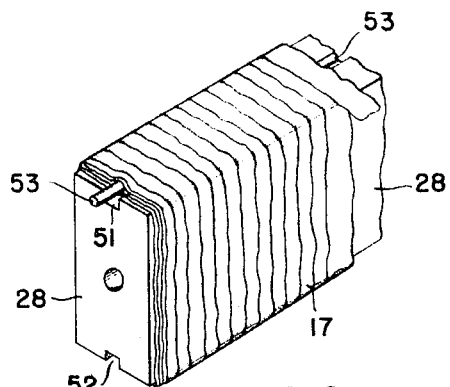
FIGURE 2 is a perspective view of one end of a typical spool with the opposite end cut away.

Going now to FIGURE 2, the spool 28 is shown as having a groove 51 on one side thereof with a groove 52 on the opposite side thereof. It is not necessary that these grooves be in this specific relationship but are shown this way for purposes of illustration. As will be discussed in relation to FIGURE 7, any variation desired may be utilized.

Figure 3:
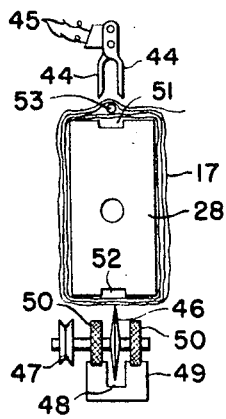
FIGURE 3 is a cross-sectional view of the spool showing its relationship to the sealing means and the cutting means.

Stiffener 53 is shown as extending through the plastic 17 at a position in the center of groove 51 (FIGURE 3).

Figure 5:
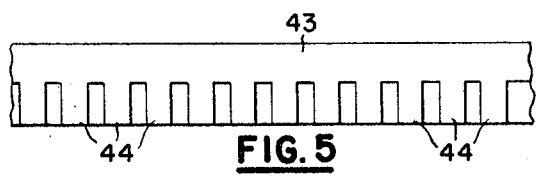
FIGURE 5 is a front elevational view of the heating and sealing element.
Figure 6:
FIGURE 6 is a bottom plan view of the heating and sealing element.

FIGURES 5 and 6 illustrate the construction of the heating and sealing element 43. It is shown as a bar with two rows of teeth extending downwardly therefrom. Attention is called to the fact that the teeth are offset so that the ends of each row of teeth overlap the ends of the teeth in the other row. This is done so as to give added rigidity to the finished product. The holes formed by the teeth are not located directly alongside each other and therefore the product is not weakened.

Figure 7:
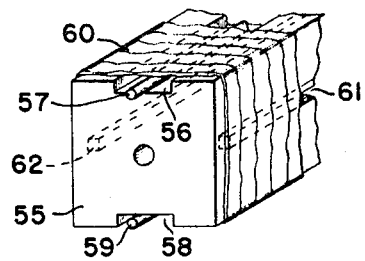
FIGURE 7 is a perspective view of a modified form of the spool with the one end cut away.

FIGURE 7 illustrates a modified form of the spool. Here spool 55 is shown as containing groove 56 in the top thereof with groove 58 in the bottom. Along either side of the spool are grooves 61 and 62. Stiffening member 57 is shown in the middle of the plastic and located over groove 56 while stiffening member 58 is shown located over groove 59.

With a spool according to this modification, heating element 43 would be applied to groove 56 and also to groove 58 thus sealing the material in two places. Then when cutter 46 is moved along grooves 61 and 62 we will have two finished plastic articles instead of the single one produced by spool 28.

The spools used are capable of any variation and modification to suit the type of article desired.

Operation of my method and apparatus is as follows:

Spool 14 is placed on support 10 and strip 17 is fed up through guide 16, through ring 18 of traveller 19, and fastened to one end of spool 28 which has been placed between the mounts 29 and 30 and adjusted by means of adjusting wheel 35.

Power means 34 and the power means (not shown) connected to belt 26 are turned on. Power means 34, through its mechanical connections, rotates spool 28 and as it rotates the plastic strip 17 is wound thereon. As pulley 25 is rotated, screw member 20 rotates and traveller 19 moves along screw 20 in a longitudinal direction. As it does so it moves strip 17 and it is wound along the spool so that the different winds overlap each other.

When traveller 19 reaches the end of screw 20 the reverse threads on screw 20 cause it to reverse itself and move in the opposite direction.

Attention is called to the fact that since plastic supply 14 does not rotate but remains in a fixed position relative to holder 10, as the strip 17 is wound off the roll and through guide 16 it will not remain flat as it is on the roll but will twist, giving the plastic a rolled effect as it goes through guide 18 and onto spool 28.

The overlapping layers of plastic wound onto spool 28 therefore take the form of a flattened rolled strip instead of a flat strip. This gives the finished product a more decorative appearance.

After approximately one half of the amount of plastic to be used has been wound onto spool 28 the rotation of spool 28 is stopped and stiffening member 53 (FIGURE 3) is placed longitudinally along the top of the spool 28 in a position in the center of groove 51. It may be held in this position by fastening it to plastic 17 by means of staples, glued tape, or any means desired.

Once the stiffener is in position the winding is resumed and when the correct amount of plastic has been wound onto spool 28 stiffener 53 is located in the middle of the layers of plastic.

With the spool in the position shown in FIGURE 3, the heated element 43 is lowered down into groove 51 so that the teeth 43 go all the way through the plastic. The heat from the teeth 44 melts and seals the layers around the holes formed by the teeth. Heating element 43 is raised again.

Cutter 46 is moved from the position shown in FIGURE 1 along the longitudinal groove 48 for the entire length of spool 28. In doing so the cutter cuts through all the layer of plastic 17 at a position in the center of groove 52. This makes free ends of plastic 17 on each side of spool 28.

Figure 4:
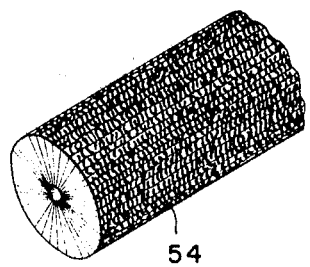
FIGURE 4 is a perspective view of one end of a finished plastic article made according to my inveniton.

When the article is removed from the spool 28 the many ends of plastic 17, all connected to stiffener 53 and held there by the heat-sealed holes formed by teeth 44, will flare outwardly as shown in FIGURE 4 forming a cylindrical article such as that shown at 54. This member 54 may be made into any decorative shape desired such as a wreath, a cross, a candy cane, a doll, etc.

When a spool such as that shown in FIGURE 7 is used, the heating element is applied to groove 56, then to groove 58, and the cutting element is applied to groove 61 and then to groove 62. Thus we have two articles which will each flare out such as article 54 to form a finished product.

Having described only one embodiment of my invention, I do not wish to be limited or restricted to specific details herein set forth but wish to reserve to myself any variations or modifications that may appear to those skilled in the art.

What is claimed is:

1. The method of making plastic articles which comprises:
   (a) helically winding a plurality of overlapping layers of twisted plastic strip on a holder,
   (b) then radially heat sealing together the helically would plastic layers along a relative narrow longitudinal path,
   (c) thereafter longitudinally slitting all of the layers of helically would plastic along a line displaced from the heat sealed area produced in (b), thereby permitting the cut unsealed layers of plastic to flare outwardly so that the heat sealed portion constitutes an axis.

2. The method of making plastic articles which comprises:
   (a) helically winding a plurality of overlapping layers of twisted plastic strip on a holder,
   (b) then radially heat sealing together and puncturing simultaneously the helically wound plastic layers along a relative narrow longitudinal path,
   (c) thereafter longitudinally slitting all of the layers of helically wound plastic along a line displaced from the heat sealed area produced in (b), thereby permitting the cut unsealed layers of plastic to flare outwardly so that the heat sealed portion constitutes an axis.

3. The method of making plastic articles which comprises:
   (a) helically winding a plurality of overlapping layers of twisted plastic strip on a holder,
   (b) then positioning longitudinally a stiffening element on said helically wound plastic after a portion of predetermined total plastic strip has been wound on the holder,
   (c) thereafter continuing with the remainder of the predetermined plastic strip the step of helically winding a plurality of overlapping layers of twisted plastic strip,
   (d) then radially heat sealing together the helically wound plastic layers along a relative narrow longitudinal path,
   (e) thereafter longitudinally slitting all of the layers of helically wound plastic along a line displaced from the heat sealed area produced in (d), thereby permitting the cut unsealed layers of plastic to flare outwardly so that the stiffening element and heat sealed longitudinal portion constitutes an axis.

4. The method of making plastic articles which comprises:
   (a) helically winding back and forth a plurality of overlapping layers of twisted plastic strip on a holder,
   (b) then positioning longitudinally a stiffening element on said helically wound plastic after a portion of predetermined total plastic strip has been wound on the holder,
   (c) thereafter continuing with the remainder of the predetermined plastic strip the step of helically winding back and forth a plurality of overlapping layers of twisted plastic strip,
   (d) then radially heat sealing together and puncturing simultaneously the helically wound plastic layers along a relative narrow longitudinal path,
   (e) thereafter longitudinally slitting all of the layers of helically wound plastic along a line displaced from the heat sealed area produced in (d), thereby permitting the cut unsealed layers of plastic to flare outwardly so that the stiffening element and punctured heat sealed longitudinal portion constitutes an axis.

5. The method of making plastic articles which comprises:
   (a) helically winding simultaneously a plurality of overlapping layers of strips of twisted plastic on a holder,
   (b) then positioning longitudinally a stiffening element on said helically wound plastic,
   (c) thereafter continuing with the step of helically winding simultaneously a plurality of overlapping layers of strips of twisted plastic,
   (d) then heat sealing the helically wound plastic layers on each side of the stiffening element,
   (e) then longitudinally slitting all of the layers of helically wound plastic along a line displaced from the stiffening element, thereby permitting the cut loose layers of plastic to flare outwardly so that the stiffening element and heat sealed longitudinal portion constitutes an axis.

6. The method of making plastic articles which comprises:
   (a) helically winding simultaneously a plurality of overlapping layers of strips of twisted plastic on a holder, said winding being accomplished for at least one pass on said holder,
   (b) then positioning longitudinally a stiffening element on said helically wound plastic after one-half of the total passes have been completed,
   (c) thereafter completing said winding with like number of passes by helically winding simultaneously a plurality of overlapping layers of strips of twisted plastic,
   (d) then heat sealing together and puncturing simultaneously the helically wound plastic layers longitudinally on each side of the stiffening element, said punctures on one side of the reinforcing element being offset with respect to the punctures on the other side of the stiffening element,
   (e) then longitudinally slitting all of the layers of helically wound plastic along a line remote from the stiffening element and substantially parallel therewith thereby permitting the cut loose layers of plastic to flare outwardly so that the stiffening element and punctured heat sealed longitudinal portion constitutes an axis.

References Cited

UNITED STATES PATENTS

| | | | |
|---|---|---|---|
| 500,627 | 7/1893 | Steward | 57—167 XR |
| 1,318,150 | 10/1919 | Howard | 156—440 XR |
| 2,596,292 | 5/1952 | Sackner | 255—184 |
| 3,145,524 | 8/1964 | Dewelle | 57—58.49 |
| 3,243,334 | 3/1966 | Lake | 156—583 |
| 785,321 | 3/1905 | McLaughlin | 156—173 X |
| 1,514,787 | 11/1924 | Protz | 161—12 X |
| 1,659,584 | 2/1928 | Willis | 161—12 X |
| 2,545,243 | 3/1951 | Rumsey | 156—253 X |
| 3,031,360 | 4/1962 | Currier | 156—124 X |
| 3,104,191 | 9/1963 | Hicks et al. | 156—174 |
| 3,115,564 | 12/1963 | Stacy | 156—252 X |
| 3,241,588 | 3/1966 | Osher et al. | 156—251 X |
| 3,256,129 | 6/1966 | Wallerstein et al. | 156—176 X |

EARL M. BERGERT, Primary Examiner

D. J. FRITSCH, Assistant Examiner

U.S. Cl. X.R.

161—12